United States Patent [19]

Alieri et al.

[11] Patent Number: 5,007,150
[45] Date of Patent: Apr. 16, 1991

[54] APPARATUS FOR THE APPLICATION OF A GASKET INSIDE CLOSURES COMPRISING A CUP, SUCH AS SCREW-ON AND CROWN CAPS

[75] Inventors: Rodiero Alieri, Imola, Italy; Paul L. Thomason, Largo, Fla.

[73] Assignee: Tredegar Molded Products Company, Richmond, Va.

[21] Appl. No.: 555,104

[22] Filed: Jul. 20, 1990

Related U.S. Application Data

[63] Continuation of Ser. No. 488,402, Feb. 28, 1990, which is a continuation of Ser. No. 192,656, May 11, 1988, abandoned, which is a continuation of Ser. No. 860,58, May 7, 1986, abandoned.

[30] Foreign Application Priority Data

Jun. 24, 1985 [IT] Italy .................................. 3474 A/85

[51] Int. Cl.$^5$ .............................................. B29C 1/04
[52] U.S. Cl. ........................................ 29/33 J; 29/36; 425/125; 425/809
[58] Field of Search ..................... 24/33 J, 33 K, 36; 425/125, 127, 128, 245, 809

[56] References Cited

U.S. PATENT DOCUMENTS

| | | | |
|---|---|---|---|
| 2,952,035 | 9/1960 | Gora | 425/809 X |
| 3,135,019 | 5/1964 | Aichele | 425/125 |
| 3,360,827 | 1/1968 | Aichele | 425/128 |
| 3,366,723 | 1/1968 | Green | 264/268 |
| 3,674,393 | 7/1972 | Busi | 425/110 |
| 3,702,148 | 11/1972 | Busi | 141/67 |
| 3,877,497 | 4/1975 | Busi | 141/138 |
| 4,343,754 | 8/1982 | Wilde et al. | 264/154 |
| 4,398,989 | 8/1983 | Allen et al. | 156/245 X |

Primary Examiner—Z. R. Bilinsky
Attorney, Agent, or Firm—Emch, Schaffer, Schaub & Porcello Co.

[57] ABSTRACT

The invention refers to an apparatus which allows the application of a round gasket or liner inside closures. The apparatus consists of a plastic material batching carousel carrying, on a horizontal plate a plurality of shuttles or molds peripherically distributed and whose top surface is provided with a recess or hollow. On the carousel are elements which take and leave batches of plastic material supplied by an extruder inside the recesses. A first star wheel at the bottom of the carousel is provided to transfer the shuttles having the batches therein towards a forming carousel where the batches of plastic material are pressed to form round gaskets. A second star is provided to transfer the shuttles with the molded gaskets toward a further carousel where gaskets are inserted into cups or closures. The latter is provided with elements which conveys the cups along a way over the shuttles, while taking elements, placed on top of the conveyance elements, are provided to extract the round gaskets from the shuttles and to introduce them into the cups which, one at a time, come to be positioned under them. At the bottom of the inserting carousel a star wheel for moving away complete closures and a star wheel for transferring the evacuated shuttles towards the batching carousel are provided. It is also anticipated to use completely flat shuttles, that is to say without any recess. In this case, modified devices will be used in the forming carousel.

14 Claims, 4 Drawing Sheets

APPARATUS FOR THE APPLICATION OF A GASKET INSIDE CLOSURES COMPRISING A CUP, SUCH AS SCREW-ON AND CROWN CAPS

Application Ser. No. 07/555,104, filed 7/20/90 is a continuation of Application Ser. No. 07/488,402, filed 2/28/90 and now in issue which is a continuation of Application Ser. No. 07/192,656, filed 5/11/88 and abandoned 5/17/90, which is a continuation of 06/860,582, filed 5/7/86 and abandoned. The priority document is Italian PCT Application No. 3474A/85, filed 6/24/85.

This invention covers an apparatus for the application of a gasket inside closures comprising a cup, such as screw-on and crown caps. The technologies known up to now concerning the application of gaskets inside closures of the above mentioned type foresee, as a starting element, the extrusion of a belt having a suitable thickness and the blanking of disketts from such belt which are then inserted into cups for the completion of the closures. Through the known technologies there are not negligible inconveniences to be taken back, above all, to the fact that through the blanking a lot of scrap is produced; moreover, the flat configuration of the extruded belt does not allow to model the shape of the gasket for adapting them to the mouth of the containers they are to be applied at. Therefore, the technical task of this invention is to propose an apparatus by which the inconveniences of the known technologies are substantially reduced. Such task is attained by means of an apparatus which is characterized by the fact that it includes a batching carousel of plastic material bearing, on a horizontal plan, a plurality of shuttles, peripherically distributed around it and, on the upper part of it, provided with a recess, elements to take and leave batches of plastic material taken from an extruder inside the recesses, a first star for transferring the shuttles from such batching carousel to a forming carousel where the batches of plastic material are pressed to form round gaskets, a second star for transferring the shuttles having the molded gaskets to an inserting carousel for moving the molded gaskets into the cups; the carousel includes conveyance elements of the cups along a way over the shuttles and taking elements to remove the gaskets at the top of such conveyance and leaving elements of the same along said way; a third star for transferring the evacuated shuttles from the inserting carousel to the batching carousel and moving away elements for the cups containing the gaskets.

Further features concerning this invention will be better explained from the following description of a preferred embodiment, illustrated by way of example in the attached drawings where:

Figure 1:
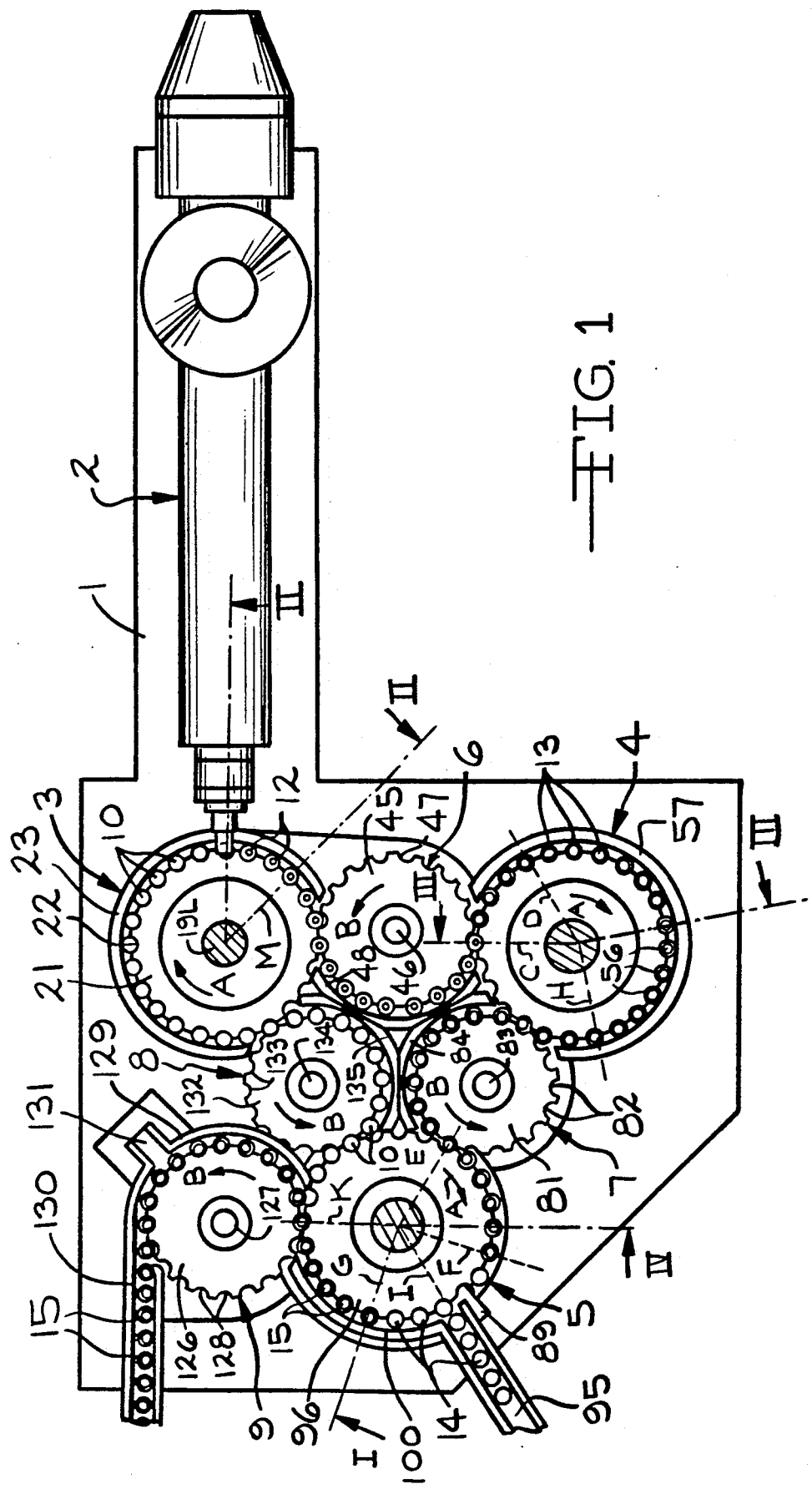
FIG. 1 shows a plan view of the apparatus.
Figure 2:
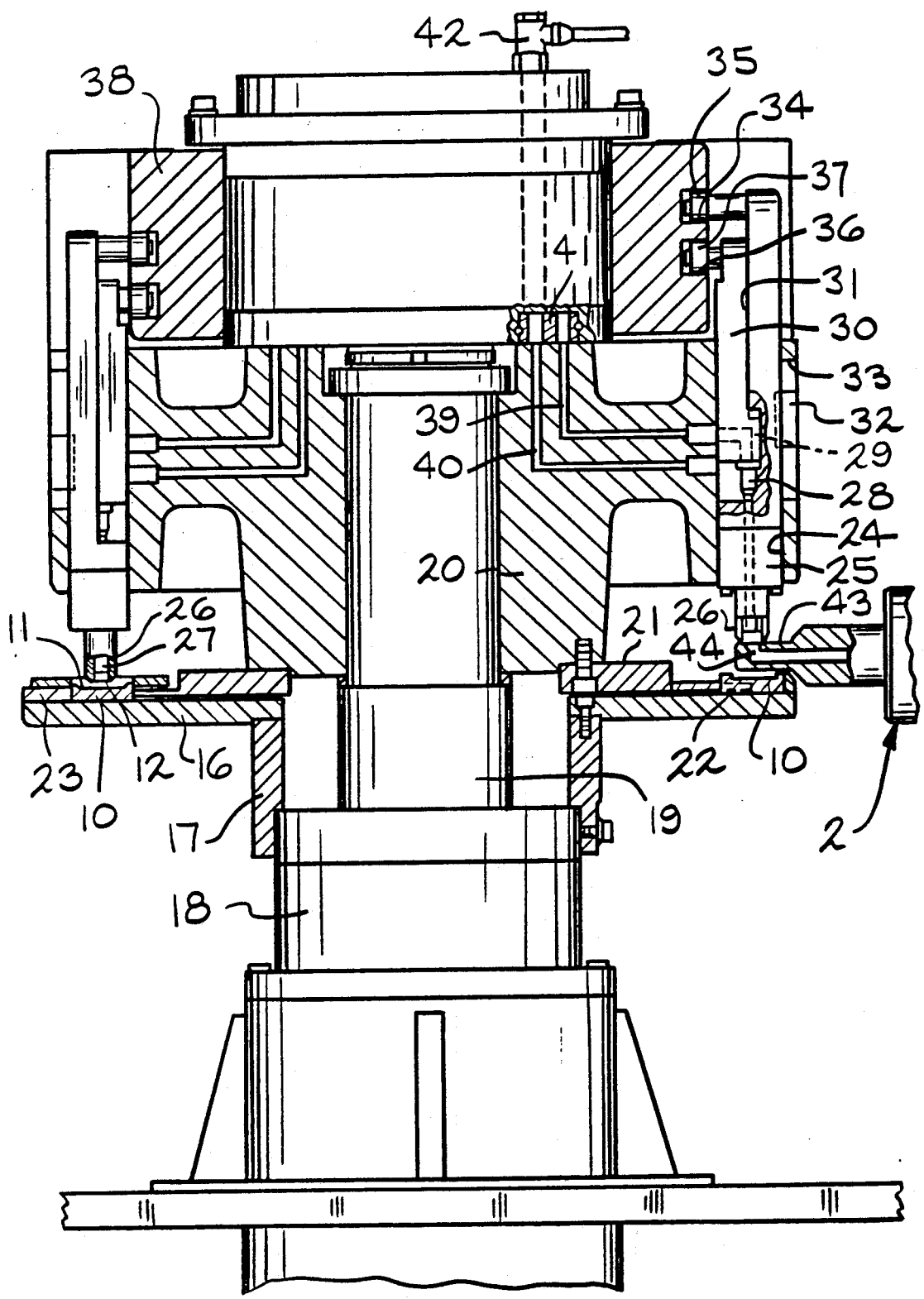
FIG. 2 is a vertical section view according to plan II—II of FIG. 1.

Before analyzing the apparatus in detail, in order to make easier the understanding of its structure and working, hereafter there is a preliminary description with reference to FIG. 1. In FIG. 1, 1 is the bed or base of the apparatus on which there are assembled the extruder 2 supplying the plastic material for the gasket or liner molding and three carousels or turrets 3,4,5 placed according to the vertexes of an equilateral triangle and the three of them revolving in a clockwise direction A. Between the carousels 3,4,5 there are interposed three devices or transfer star wheels 6,7,8 all of them revolving in direction B and tangential to the carousels themselves. The star wheel 9 that moves away complete closures also revolves in direction B. The transfer carousels and stars are peripherically provided with semicircular seats equidistant tangentially in which round element shuttles or individual molds 10 are inserted. On the upper face of each mold 10 there is a recess or hollow 11 for the molding of the plastic gaskets or liners 13. As you can see in FIG. 1, the shuttles 10 give rise to a closed train ring shaped proceeding zigzag alternatively in directions A and B following a trajectory that is clover shaped. The apparatus works in the following way. In carousel 3, the softened plastic material supplied by the extruder 2 is deposited in small batches or pellets 12 in the hollows 11 of the shuttles 10 on the forming carousel where the batches, due to the action of suitable punches, are squeezed to take the shape of the hollow 11 thus giving rise to round gaskets 13. The squeezing of the batches is effected on a rotating angle of about 60° included between radius C and D where C is the radius joining the rotation center of carousel 4 with the tangent point of the carousel 4 with star 6. From carousel 4 shuttles are taken by means of star 7 to carousel 5. Along the angular section which, from the tangent point of star 7 with carousel 5, symbolized by radius E, stretches for about 75° until radius F, suitable taking elements described more in details later, extract the gasket 13 from the hollow 11 of the shuttles and insert them into cups or closures 14 fed in carousel 5 and supported at a height between gaskets 13 and shuttles 10. The deposit of the gaskets inside the cups 14 is completed after a rotation of about 165° starting from the angular position E, in line with radius G. When this phase is carried out, the lined closures 15 (that is cups 14 containing gaskets 13) are transferred to the moving away star 9 and then guided to the collecting point. With particular reference to FIG. 2, carousel 3 includes a horizontal and stationary plate 16 which is supported by means of a spacer ring 17, by a coupling 18 which rises from a bed or base 1 to which it is integrally attached. A vertical shaft 19 is revolvingly supported in coupling 18; to this shaft a cylindrical body 20 is rotatingly integrally attached. Shaft 19 receives motion from a motor assembly placed in bed 1 and not described here because it is completely traditional and unrelated to this invention. A plate 21 is lowerly centered to body 20 and fixed coaxially to shaft 19; this plate provides along the periphery a plurality of recesses or semicylindrical seats 22 equidistant and opened towards the outside of, the plate 21 giving it the aspect of a cogwheel. Around plate 21, whose radial distance from the bottom of seats 22 is equal to the diameter of the seats themselves, stretches an edge or guide member 23 concentric to shaft 19. In seats 22 the shuttles 10 find room, externally, resting against edge 23 thus guiding them along a circular way. In body 20, in line with seats 22, there are provided vertical seats 24 in which there are sliding elements for taking the batches 12 of plastic material supplied by extruder 2 and introducing them into the hollows 11 of the shuttles. Such elements include a cylindrical element 25 axially pierced which, in the lower part, is provided with a sort of spoon 26 turned in the rotating direction A of carousel 3. The spoon 26 is obtained by cutting, on a longitudinal plan, a reduced tubular part of cylinder 25 so that the spoon takes the shape of a hollow semicylinder.

Axially to the cylinder, 25, there is assembled a little pipe 27 whose lower end is opened and stretches into spoon 25 while the upper end is in communication by means of a connection 28 with a hole 29 made inside a guide 30. Guide 30 is placed within a seat 31 of the cylindrical element 25 in order to slide parallel to the rotation axis of the carousel. The cylindrical element 25 is prevented from rotating in seat 24 by means of key 32 sliding in a slot 33 of body 20. The cylindrical element 25 is vertically operated by a cam 34 in which there is a pin 35 cantilevered assembled on its top. In the proper sequences the little pipe 27 is operated, with respect of the cylindrical element 25, by means of a further cam 36 where there is inserted a pin 37 and supported at the top of the guide 30. The cams 34 and 36 are annular shaped on the external surface of a drum 38 that is stationary with respect to the carousel and installed coaxially on the shaft 19 over body 20. Hole 29, made in guide 30, is designed to be set selectively in communication with the first radial duct 39 and with a second radial duct 40 in body 20 and flowing to the outside of body 20. The ducts 39 and 40 are joinable respectively by a sucking or vacuum source and a blower or air pressure source. To this purpose the ducts 39 and 40 exit on the upper face of body 20 and are controlled by a ring 41 set in the drum 38 with the interposition of sealing rings. Moreover, in drum 38 there are, angularly offset, relevant pipes 42 for the connection with the vacuum and air pressure sources. Only one is shown in the drawing.

Due to the cams 34 and 36 the spoon 26 and the internal little pipe 27 are lifted and then lowered with respect to the shuttles 10. In the lifted position between spoon 26 and the opposite shuttle 10 there is inserted the nozzle 43 of the extruder head 2. Nozzle 43 shows an orifice 44 turned vertically upwards and arranged to extrude plastic material to be shaved by the spoon 27 when it passes over it for picking up the batch or pellet 12. The transfer star 6 includes a plate 45 coplanar with plate 21 keyed at the top of a shaft 46 revolvingly supported vertically in bed 1 and kinetically joined with shaft 19 so that plates 45 and 21 have the same tangential speed. On the periphery of plate 45 there are provided semicircular seats 47 which together with an edge or guide 48 direct the shuttles received by carousel 3 to carousel 4.

Figure 3:
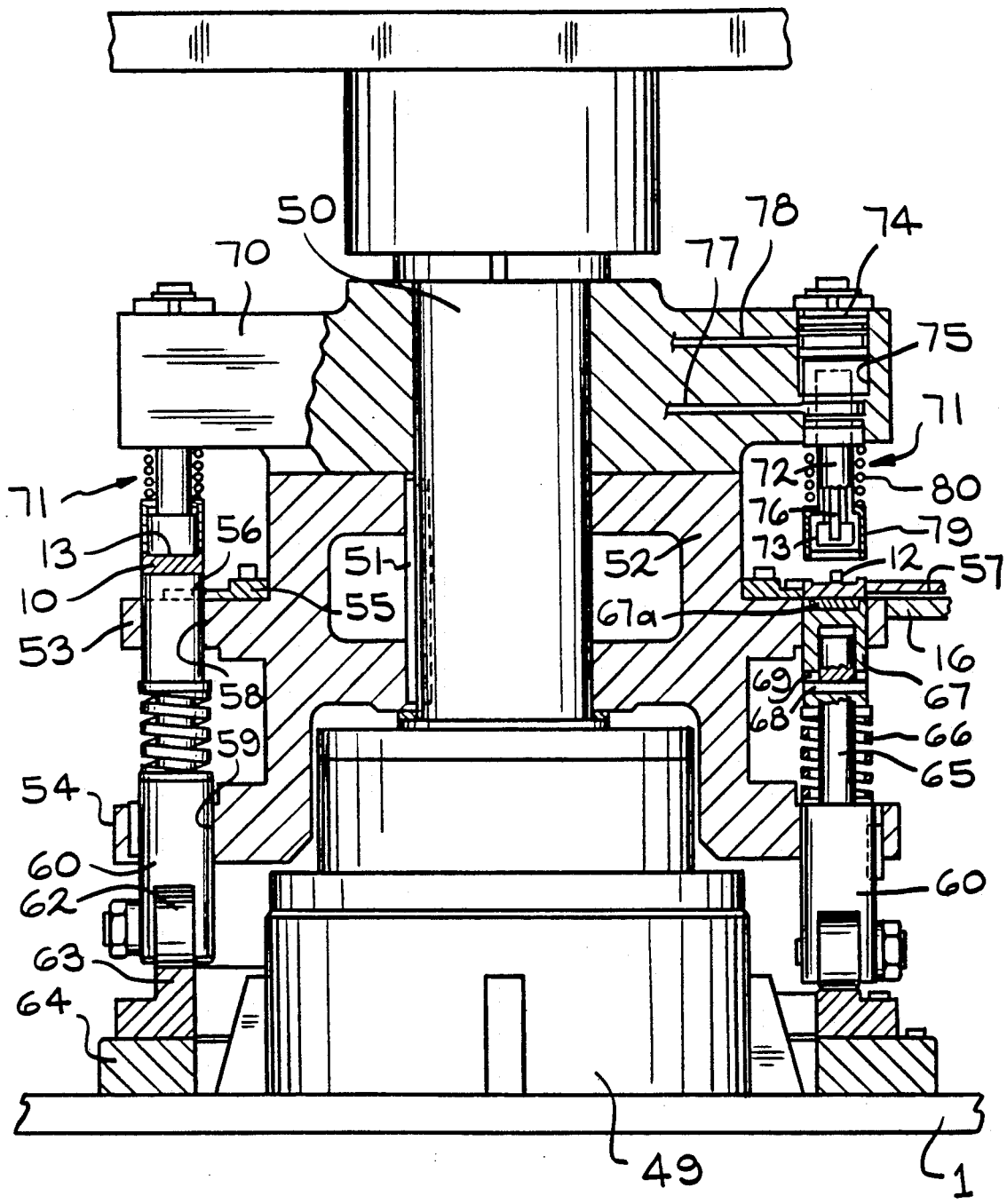
FIG. 3 is a vertical section view according to plan III—III of FIG. 1.

Carousel 1 (see FIG. 3) includes a coupling 49 installed in bed or base 1 in which it revolvingly supports shaft 50 operated by the same motor assembly which operates shaft 19. On shaft 50, by means of a key 51, is keyed a drum 52 which in the lower part, is placed over coupling 49 and is externally provided with two circular collars 53,54. Collar 53 has the upper face coplanar with the surface of plate 16 and, on it, there is fixed a crown or plate 55 having semicircular equidistant seats 56 for the housing of the shuttles 10 coming from the transfer star 6. At least for an initial section starting from the angular position marked with radius C, around crown 55 an edge 57 is provided which holds the shuttles in the relevant seats 56. In collars 53,54 there are provided holes 58–59 which are in line vertically with seats 56. In each hole 59 a tang or lifter assembly 60 is slidably guided vertically and prevented from revolving by a key 61 inserted in a slot axial to hole 59. At the far bottom of tang 60 there is assembled a pin 62 having its rotation axis radial with reference to shaft 50. Pin 62 rolls on an annular cam 63 which is fixed on bed 1 with the interposition of a spacer bearing 64. The upper end of tang 60 is provided with a coaxial shank 65 having a smaller diameter making a bearing shoulder for a spring 66. Spring 66 operates on a bushing 67 placed over shank 65 and held by a pin 68 which extends through the diameter of the shank. On top of bushing 67 there is provided a recess for the housing of a magnet 67a for the holding of shuttles 10. The opposite ends of pin 68 are inserted in slots 69 of bushing 67 which slots are axially extended in order to allow the bushing 67 to slide on the shank 65 against the transmission action made by spring 66. Cam 63 is made in such a way that the top of the bushing 67 is coplanar with the upper face of plate 16 along the arc between the angular position C and D in order to receive the shuttles from star 6 then project from the same face along the arc between the angular position D and the angular position marked with radius H and then lower again on the coplanar height with plate 16 before reaching the tangent point with transfer star 7.

On drum 52, and rigidly connected therewith, there is placed a flange 70 which is provided with cylindrical seats or openings 75 in vertical alignment with bushing 67 and which supports hollow punch assemblies 71. Each punch 71 includes a tubular part and a hollow head 73. The tubular head 72 is inserted slidingly in a connector 74 housed in a cylindrical seat 75 coaxial to the relevant hole 58. In the tubular part 72 is placed concentric therewith a little pipe 76 which ends in the hollow head 73. The little pipe 76 is connected with a duct 77 of the flange 70 through which it is lead to the hollow head 73 a heating fluid or a coolant whose return comes through the hollow space between the little pipe itself and the tubular part 72 and a second duct 78 of flange 70.

On head 73, a ring 79 is guided and it is provided, on one side, with an internal projection that is seated on top of head 73. Ring 79 has a length such as to project below the lower edge of head 73 and an outside diameter equal to the one of shuttles 10. Between ring 79 and flange 70 a spring 80 is interposed keeping the ring pushed downwards.

As previously stated, in carousel 4 there is the molding of the gaskets 13 by means of the lifting of the shuttles 10 due to bushing 67 against punches 71 and resulting squeezing of the batches 12 of plastic material inside hollows 11. The temperature of the molding of gaskets 13 is adjusted by the letting in of liquid into the hollow punches 71 through ducts 77,78. For example, if the plastic material of the batches is made of PVC (polyvinyl cloride) the punches will be duly heated through the letting in of hot water. Instead, in case the plastic material is PE (polyethylene) or EVA (ethylenevinylacetate) the punches will be cooled off through the letting in of cold water. When the molding of the gasket is over, shuttles pass to the transfer star 7 which is completely the same as transfer 6. In fact, also this one includes a plate 81 coplanar with plate 16 and provided with semicircular seats 82 distributed along the periphery. Plate 81 is revolvingly integral to a shaft 83 and all around it along the section stretching from carousel 4 to carousel 5 in direction B there is provided an edge or guide 84 that is concentric and which keeps the shuttles in seats 82 up to their introduction into carousel 5 where gaskets are introduced into cups or closures 14.

Figure 4:
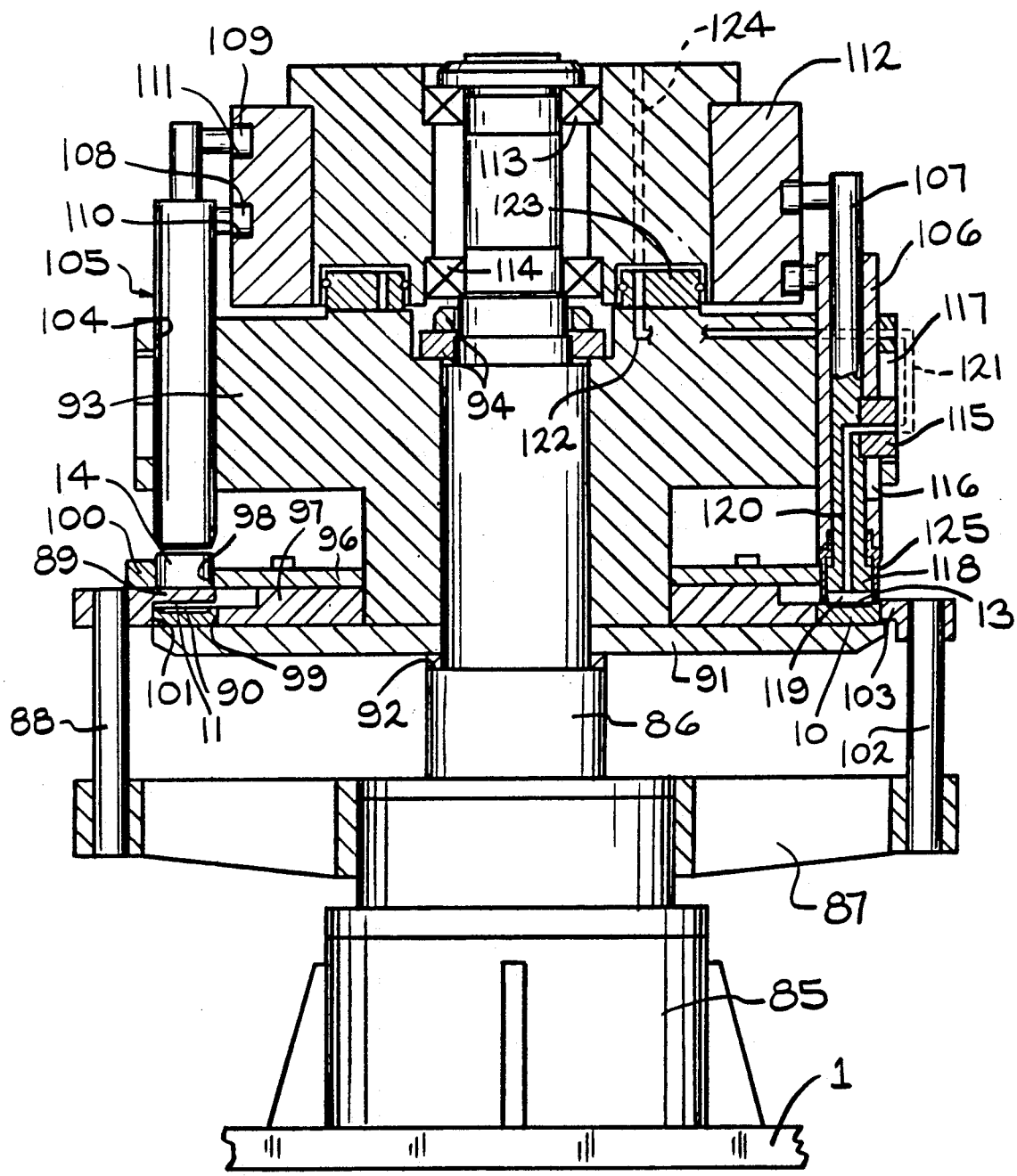
FIG. 4 is a vertical section view according to plan IV—IV of FIG. 1.

Carousel 5 (see FIG. 4) is composed of a coupling 85 installed on bed 1 and acting as a revolving support for a vertical shaft 86 operated by the same motor elements which power also shaft 19,46,50,83. On coupling 85 there is centered a circular flange 87 in whose periphery there is a plurality of studs 88 parallel to shaft 86. On top of studs 88 there is rigidly supported a stationary guide 89 whose shape is concentric to shaft 86. Guide 89 stretches from an angular position I (see FIG. 1) of carousel 5 where in line with it the cups 14 are fed which are going to receive the gaskets up to the tangent point with the moving away star 9 which coincides with radius K. In the lower part of guide 89 there is provided a channel 90 open towards the inside and closed downwards by a circular disk 91. Disk 91 is centered and resting on a shoulder 92 of shaft 86 together with a drum 93 standing above. Disk 91 and drum 93 are rotatingly coupled to shaft 86 by means of a ring nut and counter ring nut 94 screwed on a threaded part of shaft 86. Note that the upper face of disk 91 and guide 89 are respectively coplanar with the upper face of plate 16, and with the surface of the conveyor 95 for feeding cups 14. Moreover, to disk 91 are rotatingly fixed two plates 96,97 placed one on top of the other which are provided with peripherally equidistant and opposite semicircular seats 98,99. Plate 96 has its lower surface coplanar with the upper surface of guide 89. Seats 98,99 are in vertical line and around them there is provided concentrically an edge 100 fixed on guide 89 and a wall 101 of the channel 90 for respectively guiding shuttles 10 and cups 14 during the revolving of the carousel. Studs 102 are placed along the angular part included between the radius E and I and support an edge or guide 103 whose internal wall lies in the same cylindrical plane as wall 101.

In drum 93, in vertical line with the seats 98,99 therebelow, there are provided holes 104 where the taking elements marked on the whole with 105 are guided and each of them is composed of a tube 106 sliding in a relevant hole 104 and of a shank or rod 107 sliding inside tube 106. At the upper end of tube 106 and of shank 107 there are assembled centilevered idle pins 108,109 inserted in cams 110,111 which are annular shaped in a cylindrical body 112 that is stationary with reference to the carousel in which shaft 86 is revolvingly supported with the interposition of revolving bearings 113,114.

There is a key 115 on shank 107 which crosses the tube 106 in line with a slot 116 that is vertically elongated. Key 115 projects outside through a slot 117 that is also vertically elongated from drum 93 so that tube 106 and shank 107 while they can slide axially one on the other in hole 104 they are prevented from rotating. The lower end of the shank 107 makes a sort of bell 118 which provides a hollow 119 communicating with a duct 120. Duct 120 stretches for a certain section along the axis of shank 107 and thereafter radially through the key 115 to flow to the external surface of drum 93. An annular connector 121 of flexible material connects duct 120 with a duct 122 provided radially in drum 93 and connected by means of sucking or vacuum elements through a ring 123 sealingly enclosed in body 112 and providing a duct 124.

The lower end of tube 106 is provided with a bushing 125 which wraps around bell 118. Bell 118 and bushing 125 have such a diameter that when the taking element 105 is completely lowered, they rest respectively on the gasket 13 and on the edge of the shuttle 10 surrounding the hollow 11.

At the exit of carousel 5, while closures 15 are fed into the moving away star 9, shuttles 10 are introduced into star 8 which transfers them into the batching carousel 3. The moving away star 9 includes a plate 126 installed on top of a shaft 127 and lying at the same height as plate 96. Along the periphery, plate 126 is provided with semicircular recesses 128 which in cooperation with an edge 129 concentric to shaft 127 guide the closures 15 towards the moving away conveyor 130. A hopper 131 is provided where possible defective closures are unloaded. Similarly to stars 6 and 7, even star 8 includes a plate 132 tangent to both carousel 5 and 3 and provided with peripherial semicircular seats 133. Plate 132 is integrally fixed to shaft 134 which lies at the height of plate 97 for receiving from that plate the shuttles 10 and to transfer them again to carousel 3 in cooperation with edge 135.

The way each of the single carousels 3,4,5 work is as follows. When the carousel 3 revolves, the cylindrical elements 25 are operated in sequence through cam 34, between a lifted position and a lowered one. In the lifted position (on the right of FIG. 2) in correspondance with position marked with L on FIG. 1 the cylindrical elements 25 pass over the nozzle 43 and pick up, by means of spoon 26 a batch or pellet 12 of plastic material ejected in the meantime from the orifice 44 of extruder 2. During such a phase, the little pipe 27 relevant to the spoon which makes the taking, is lifted with reference to the spoon itself and is in communication through the relevant duct 39 with the pneumatic sucking or vacuum means. Spoon 26 is then depressed thus allowing the downward movement of it along with the taken batch of plastic material. Then, the cylinder 25 operated by cam 24 lowers down to move spoon 26 into the hollow 11 of shuttle 10. At the same time the little pipe 27 operated by cam 36 moves downward. The travel of the little pipe continues with reference to the cylindrical element so as to cause the detachment of the batch or pellet 12 from the spoon and the connection of the little pipe with duct 40 through which it is connected with the pressurized air. In such a way, the detached batch 12 of plastic material in correspondence of the angular position marked with M of FIG. 1 is deposited in hollow 11 of shuttle 10 that is below.

The shuttles 10 that are provided with batch 12, are tangentially introduced into seats 56 of carousel 4 by means of star 6. During the passage between the angular positions C and D, operated by cam 63, the shuttles are lifted by bushing 67 and brought peripherically in contact with ring 79 which together with hollow head 73 closes the hollow 11 in the upper part of the shuttles. The further lifting of the shuttles (which stay attached at bushings 67 due to the magnets 67a) causes the squeezing of batch 12 which, in spreading, occupies all of the hollow 11 taking the shape and giving rise to a round gasket or liner 13. During the revolving from the angular position D until position H there comes the stabilization of the plastic material in hollow 11. When position H is overtaken, bushing 67 is again lowered thus allowing the shuttles to enter again the seats 56 and then to pass into star 7 and to be transferred into the final carousel 5 where they are inserted in seats or recesses 99.

For the portion before the angular position E, the taking elements or lifter assemblies 105 are lowered on the shuttles by cams 110,111. More precisely, the lowering of elements 105 is controlled in such a way that in correspondence with the angular position E that the bush 125 is resting in the periphery of the relevant shuttle and the bell 118 on gasket 13. Thereafter, the vacuum is created in hollow 119, causing the adhesion of gasket 13 to bell 118. In order to avoid the gasket entering the hollow 120 due to the sucking effect the lower closing of the bell can be provided with a pierced disk which allows application of the vacuum to the gaskets. The evacuation of bell 118 is operated in connecting the hollow 119 with the vacuum elements 120-122. As soon as the gasket is firmly attached at the bell, due to the effect of cam 11, the shank 107 is lifted so as to cause the detachment of the gasket 13 from the shuttle 16 which remains held in seat 99 by bushing 125 which is still in the lowered position. Thereafter, following the movement of cam 110, the tube 106, and also bushing 125, are lifted together with shank 107 until gasket 13 reaches a height standing over plate 96. These phases come along the rotation angle of the carousel included between radius E and I. During the further rotation of carousel 5 between I and G, the shank 107 moved by cam 111 goes down again bringing the bell 118 with gasket 13 inside the cups or closures 14 that in the meanwhile have been introduced by the conveyor 95 into seats 98 and slide between the guide 100 and are held by the plate 96. When the bottom of the cups is reached, the vacuum stops and the gasket remains seated in the bottom of the cups. While closures 15, complete with gaskets, go on to the moving away star 9, the shuttles 10 are moved again into star 8 which transfer them to carousel 3 where the cycle begins again and follows the way above described. The fact that the time of molding for gaskets is sufficiently long in order to grant a perfect molding of the gaskets, gives relevant advantages to the apparatus. The apparatus can be provided with sensors suitable to check possible gaskets imperfections and to operate the rejection of defective closures into the unloading hopper 131. Advantageously, the hollows 11 of shuttles 10 have peripherial walls converging upwards, for a more effective retention of the gasket that could become curly, due to internal tensions.

The above described apparatus is subject to numerous changes and modifications all entering the inventive idea in particular for making better the working of the plastic material. For example, it is possible to provide along the way of the shuttles suitable heating elements which are able to influence the temperature of the plastic material in the shuttles.

What is claimed is:

1. An apparatus for forming plastic liners and placing them in closures comprising:
   (a) means for supplying softened thermoplastic material;
   (b) individual mold means for receiving individual batches of thermoplastic material;
   (c) a first rotary turret carrying the individual mold means and having means for forming and depositing the individual batches in the individual mold means;
   (d) a second rotary turret having means for pressing the batches into plastic cylindrical closure liners;
   (e) a third rotary turret having means for removing the closure liners from the individual mold means and for placing the closure liners into closures carried by the third rotary turret;
   (f) means for transferring the individual mold means between the first, second, and third rotary turrets.

2. The apparatus of claim 1 wherein the means for transferring the individual mold means between the first, second, and third rotary turrets comprises a first and a second rotary transfer star wheel.

3. The apparatus of claim 2 wherein a third star wheel is provided to recycle empty individual mold means from the third rotary turret to the first rotary turret.

4. The apparatus of claim 1 including means for delivering closures to the third rotary turret.

5. The apparatus of claim 2 including a fourth star wheel for removing closures with liners therein from the third rotary turret.

6. The apparatus of claim 5 including means for ejecting closures with imperfect liners.

7. The apparatus of claim 1 including means for removing closures with liners therein from the fourth star wheel.

8. The apparatus of claim 1 wherein said individual mold means are individual shuttles having a cylindrical recess in their upper surface for forming the liner therein.

9. The apparatus of claim 8 wherein the cylindrical recess has an upwardly conveying side wall.

10. The apparatus of claim 1 wherein: the means of subparagraph (c) includes a base with a hollow coupling having a cylindrical shaft extending therethrough; a circular table attached to the coupling for supporting the individual mold means; a plate coupled to the cylindrical shaft and having recesses in the outer periphery receiving the individual mold means; a cylindrical body coupled to the shaft and having a vertical opening above each individual mold means; and a sliding element in each seat for taking softened thermoplastic from the extruder and forming the thermoplastic into the pellet and subsequently depositing the pellet in an individual mold means.

11. The apparatus of claim 10 wherein the sliding element includes: an enlarged cylindrical section axially slidable in the opening; a reduced semicylindrical portion at the lower end of the enlarged cylindrical section for forming thermoplastic material into a batch; a pipe axially slidable in and extending through the enlarged and reduced cylindrical sections; cam means for raising and lowering the pipe; vacuum means connected to the pipe when it is in the raised position; and air pressure means connected to the pipe when it is in the lowered position.

12. The apparatus of claim 1 wherein the means of subparagraph (d) includes: a base with a hollow coupling with a cylindrical shaft extending therethrough, a drum fixed to the shaft and having a lower and an upper circular collar provided with a plurality of cylindrical opening therein; the upper collar having a plate on the upper surface providing recesses normally centered over the openings to receive the individual molds; the lower collar providing a plurality of cylindrical openings vertically aligned with the opening in the first collar; a plurality of cylindrical lifter assemblies slidably mounted in the openings in the upper and lower collars for moving the individual molds upwardly and downwardly; a circular flange member fixed to the upper end of the shaft and having a plurality of hollow punch members, each punch member being mounted above an opening in the upper collar member and adapted to compress the individual batches of plastic material inside each mold member to form a flat, circular closure member in each mold when each lifter assembly is moved upwardly; and an actuator assembly on the lower end of each lifter assembly.

13. The apparatus of claim 1 wherein the means of subparagraph (e) includes: a base with a hollow coupling with a cylindrical shaft extending therethrough; a drum member mounted on the shaft for rotation therewith; a disk attached to the lower end of the drum; a first plate member mounted on the upper surface of the disk and having recesses in the periphery to receive individual molds; a second plate mounted on the top of the first plate and having recesses to receive closures; guide members fixed to the hollow coupling and positioned opposite the recesses in the first and second plate members to retain the mold members and the closures within the recesses; a plurality of vertical opening in the outer portion of the drum vertically aligned with recesses in the first and second plate members; a liner lifter assembly slidably mounted in each opening in the drum for lifting the liners from the individual molds and placing the liners into closures; and actuating means for raising and lowering each lifter assembly.

14. The apparatus of claim 13 wherein the lifter assembly includes; an outer tube having a lower end adapted to seat on an individual mold; the upper end of the tube being coupled to means for raising and lowering the tube; a cylindrical shank slidably mounted in the tube and having a lower end adapted to abut the liner in the mold; the upper end of the shank coupled to means for raising and lowering the shank; means for applying a vacuum to the lower end of shank when the liner is removed from the mold; and means to apply air pressure to the lower end of the shank when the liner is placed inside the closure.

* * * * *